US007735251B2

(12) United States Patent
Crum

(10) Patent No.: US 7,735,251 B2
(45) Date of Patent: Jun. 15, 2010

(54) CARD CARRYING BUSINESS COMMUNICATION PRODUCT AND METHOD OF PRODUCING SAME

(75) Inventor: Jesse D. Crum, Fort Scott, KS (US)

(73) Assignee: Ward/Kraft, Inc., Fort Scott, KS (US)

( * ) Notice: Subject to any disclaimer, the term of this patent is extended or adjusted under 35 U.S.C. 154(b) by 0 days.

(21) Appl. No.: 11/487,712

(22) Filed: Jul. 17, 2006

(65) Prior Publication Data

US 2008/0018098 A1 Jan. 24, 2008

(51) Int. Cl.

| | |
|---|---|
| ***G09F 1/00*** | (2006.01) |
| ***B41M 5/00*** | (2006.01) |
| ***B41M 5/40*** | (2006.01) |
| ***B29C 59/04*** | (2006.01) |
| ***B32B 38/14*** | (2006.01) |
| ***B41F 33/00*** | (2006.01) |

(52) U.S. Cl. .............................. 40/124.191; 428/32.24; 428/32.13; 428/90; 428/32.25; 428/32.34; 101/483; 156/209; 156/277

(58) Field of Classification Search ............ 40/124.191; 428/32.24, 32.13, 90, 32.25, 32.34; 156/209, 156/277, 278; 101/483
See application file for complete search history.

(56) References Cited

U.S. PATENT DOCUMENTS

| | | | | |
|---|---|---|---|---|
| 4,857,501 | A * | 8/1989 | Usami et al. | 503/200 |
| 5,534,320 | A * | 7/1996 | Raby | 428/42.1 |
| 5,795,425 | A * | 8/1998 | Brault et al. | 156/235 |
| 6,689,433 | B2 * | 2/2004 | Niu et al. | 428/32.38 |
| 6,824,839 | B1 * | 11/2004 | Popat et al. | 428/32.12 |
| 6,905,742 | B2 * | 6/2005 | Koneripalli et al. | 428/32.23 |
| 2004/0053001 | A1 * | 3/2004 | Abrams | 428/90 |

* cited by examiner

*Primary Examiner*—Lesley D Morris
*Assistant Examiner*—Syed A Islam

(57) ABSTRACT

A card based business communication is produced in a unique manner in which a pigmented coating is applied over one face of the card substrate so as to change the appearance of the card material and provide a based for a high resolution image. An image is applied either directly over the pigmented coating or alternatively, the image may be reverse printed on a transparent film such that when the film is applied over the pigmented coating, the image will be visible through the face of the film.

5 Claims, 5 Drawing Sheets

CARD CARRYING BUSINESS COMMUNICATION PRODUCT AND METHOD OF PRODUCING SAME

CROSS-REFERENCES TO RELATED APPLICATIONS

None.

FIELD OF THE INVENTION

The present invention is in the field of finished product and related intermediate and finished product manufacturing methods that are used in the preparation of articles, including laminates and other layered configurations, intended for use as a card based communication construction for promotional, informational, identification purposes and the like. More particularly, such assemblies may be used in the production of card carrying products that have a high resolution image appearance that is occasioned through the printing either directly over an opaque backing coating or alternatively on a clear or substantially transparent film.

The present invention is used to produce high color, business and marketing communications that can be manufactured in a unique process. The card bearing substrate is preferably provided with a printed image that is created with high quality graphics or images. The image may be applied directly over a pigmented coating that is applied to at least one face of the card or alternatively, the image may be applied to a transparent or substantially transparent or translucent film in a reverse format (so as to be visible through the face of the substrate). The film may then be slit or cut (e.g. die cut) to size (regular and irregular shapes) for the particular application as may be specified by the end user. That is, only a portion of the card substrate may be covered by the image as opposed to the entire surface of the card.

The assembly of the instant application can be used to create individual, card products that have, preferably a high or photo quality resolution level of greater than about 150 lines per inch and preferably such as those about 300 lines per inch or approximately 2500 to 3500 dots per inch. In addition, through use of the present invention, a card carrying an image may be created that will permit some image growth such as through ink dot expansion where the image is printed on the film as provided herein.

BACKGROUND OF THE INVENTION

There are currently a plethora of business communication constructions, marketing and advertising pieces and other items that are available in the market today for communicating products and services with an intended audience. Yet with this inordinately large selection of offerings and permutations, there remains a continuing need to develop new products due to changes in technology, societal trends, diversification of marketing, packaging and advertising campaigns and new information handling needs of businesses and consumers alike.

The market for printed communication material is also changing and becoming more sophisticated with the customers for such products, correspondingly becoming more demanding in having the communication deliver a more impactful message to customers. Printed products, such as communication pieces and other assemblies that are intended to be used in business communications, can be delivered in a wide variety of formats, constructions and configurations. However, the difficulty arises in maximizing the contact with each individual customer in order to try and capture repeat business opportunities with customers previously serviced by the business.

Today, there are wide varieties of product offerings available that serve multiple purposes and functions, including product offerings that are used in fulfilling the needs in the card carrying products market, such as identification cards, membership cards, gift cards and the like.

Conventional manufacturing processes that are used today in creating cards are typically based on or created by applying a printed paper or other imaged substrate over the surface of the card or other synthetic material which then forms the image on the card or placard material. The paper layer is adhered to the surface of the card typically through a pressure sensitive adhesive. Once the material is laminated the assembly may then be collected, die-cut and the individual cards created. That is, large sheets of plastic materials may be used as a base substrate and then through lamination of large printed sheets on the plastic or synthetic material a series of cards may be created which can then be cut down to the appropriate size for form individual cards.

Specialty cards, which may be referred to "prime" cards are those having a glossy or shiny appearance. The shiny or glossy image is commonly created by coating a varnish over the top of the paper ply that has been printed typically on a flexographic press. Flexography is commonly used today for the production of the substrates that will be used in creating prime card materials as well as for the printing of decorative items, including the rendering of packaging.

The technology employs a series of plates and one or more stations, containing inks (usually a different colored ink at each station) to apply colored images to the web as the web traverses the press. Through improvements in ink qualities and other modifications and enhancements in the technology, the image quality in flexographic presses and resulting products has improved to about 150 lines per inch.

For a point of reference, typically, screens that have rulings of about 60 to 100 lines per inch are normally used to make halftone printed images for newspapers. Screens with about 120 to 150 lines per inch are commonly used today to produce images for magazines and commercial printing. Such screens are regularly produced by electronic dot generation.

Electronic dot generation is normally performed by computers that use unique screening algorithms, in cooperation with electronic scanners and image setters, to produce halftone images that are to be subsequently used to render an image. The pixels of digitized images are first assembled into dots that are then used to form shapes, sizes, rulings, etc. which create the ultimate image produced on the substrate.

Such a conventional card based construction, a card in which a paper ply is placed directly on and adhered or otherwise affixed to the card, may suffer from various drawbacks which may be undesirable. Conventional assemblies can delaminate over time, such as due to exposure to moisture, dramatic temperature changes and other environmental conditions. If any delamination occurs with such prime card products, the prime card product will normally be ruined.

Another problem that may be encountered with such conventional card constructions is that moisture may be is absorbed in the paper layer also can cause bubbling or rippling of the paper substrate. This situation can be a particular problem where the card is placed in a high humidity environment.

What is needed therefore is a card bearing business communication construction that can be produced in a glossy configuration without suffering from the drawbacks associated with prior art constructions.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Surprisingly, it has been found that attractive promotional card products, such as those used in marketing and advertising campaigns as well as identification applications can be produced in a unique construction without suffering from the drawbacks encountered by prior art card assemblies.

In one exemplary embodiment practiced in accordance with the present invention, a card based business communication assembly is described and includes a card carrying substrate. The card carrying substrate has first and second faces, first and second transversely extending edges and first and second longitudinally extending sides. A pigmented coating is applied to at least one of the first and second faces.

The pigmented coating has a particulate material dispersed therein, with the particulate preferably having a color of white but colors other than white may be used in producing this assembly. A high resolution printed image is then applied over the pigmented coating.

In a still further exemplary embodiment that is practiced in accordance with the present invention, a card based business communication assembly is presented and includes a first layer with the first layer having first and second faces, first and second transversely extending edges and first and second longitudinally extending sides. Each of the first and second faces has a first appearance.

A second layer is applied over the first face of the second layer. The second layer includes an adhesive component, which is preferably a clear, transparent or translucent, and the second layer substantially covers the first layer and extends between the first and second transversely extending edges and first and second longitudinally extending sides.

A third layer is applied over the second layer, so as to substantially completely cover the second layer. The third layer includes pigments. The level of pigmentation or particulate in the layer may have a substantially equal density throughout the layer, or alternatively, the density of the particulate material may range from high density areas to low density areas.

A fourth layer is applied over the third layer, with the fourth layer having first and second faces. The fourth layer further includes a printed image that is provided in a reverse format on the second face, such that the printed image is visible through the first face.

In yet a still further exemplary embodiment that may be practiced in accordance with the present invention, a method of making a card based business communication assembly is described and includes the steps of initially providing a first layer. The first layer has first and second faces, first and second transversely extending edges and first and second longitudinally extending sides. Each of the first and second faces of the first layer has a first appearance.

A second layer is applied over the first face of the first layer. The second layer includes an adhesive component that is substantially clear. The second layer substantially covers the first layer and extends between the first and second transversely extending edges and first and second longitudinally extending sides of the first layer.

A third layer is applied over the second layer, with the third layer including pigments sufficient to conceal the first appearance of the face of the first layer. The third layer may be provided with a varying density of particulate matter or alternatively, the particulate material density may be constant throughout the layer.

Next, an image is produced on a fourth layer with the fourth layer having first and second faces. The image is provided in a reverse format on the second face, such that the printed image is visible through the first face. The fourth layer is then adhered over the third layer.

In alternate configurations, the pigmented layer may be applied over the image after the image has been printed on the fourth layer. In addition, after the fourth layer has been applied over the coating layer, the film may be stripped off so that the image transfers to the coated layer.

The present invention also permits the use of different stocks of material, ranging from white to dark (blue, brown, black, etc.) so that the pigmented coating can be applied in varying amounts to further aid in changing the appearance of the card material or a portion of the card material if only a portion of the card material is to be covered by the pigmented coating.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
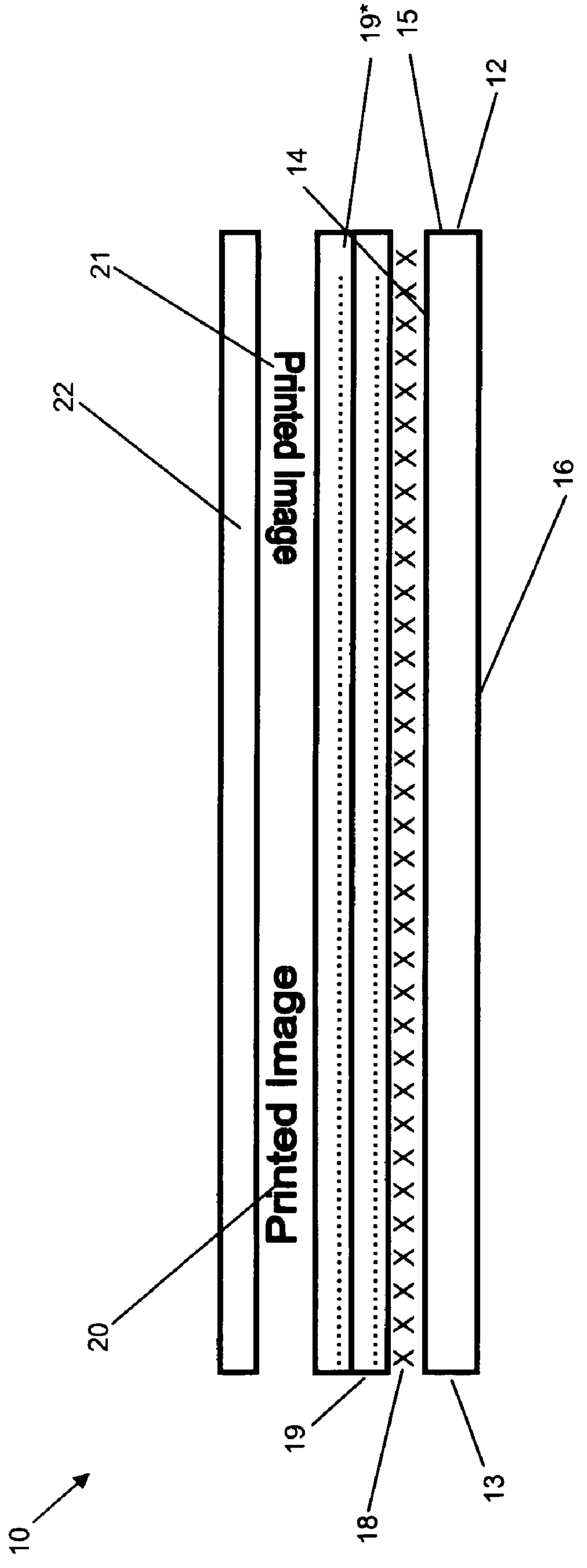
FIG. 1 depicts a cross sectional view of one exemplary embodiment of the card based business communication produced in accordance with the present invention.

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

As used herein, the term "business communication piece or document" refers to a substrate that, either alone or in combination with other documents, can convey a particular message or image or provide information about a particular product or service that is available from the provider of such pieces or documents. Business communication documents or pieces can include advertising, sales and marketing collateral and such other items used to convey information on written or imaged form sheets, brochures, presentation folders, informational sheets and combinations thereof.

The term "intermediate" as used herein refers to a product or construction that undergoes one or more processing steps prior to the intermediate reaching a final condition, that of being ready for end use or application. The additional processing steps may include printing, imaging, folding, sealing, separating, cutting, perforating, scoring, adhering and the like. Typically, a product such as with the present invention is provided in an intermediate condition so that can be further manipulated to create the final or desired end product. For example, in the present instance, the intermediate may include a card substrate with one or more layers of pigmented over coating and adhesive such that an image or imaged film can be added at a later time. Thus, in accordance with the present invention, the intermediate segment, for example, could be subject to die cutting or additional printing, such as through ink jetting, over laminating, coating or embossment.

The film stock that is used in accordance with the present invention is a clear polyethylene film that is laminated to the card material either through the use of adhesive or alternatively by a heated roller that may shrink and seal the film directly over the surface of the prime card segments. Alternatively, the heat may be used to activate the adhesive so as to adhere the adhesive to the segment, where a hot melt type of adhesive is utilized. The film may also be pre-printed with indicia using the same high quality resolution imaging device as that used to print the sheets of material that will become the prime card. The printing may be complimentary, for example a pictorial overlay that accentuates the textual image provided elsewhere on the assembly, so as to form a complete message.

In addition, the film stock can be partially transparent or clear and partially opaque or substantially translucent. The film may be applied in a continuous fashion over the surface of the material, where a continuous format is used, or alternatively, the film may be cut into individual pieces or segments with each segment being sized and configured to be about the size of the card segment.

An exemplary high resolution imaging device that is used in preparing the areas of the sheets that will become the prime card includes an Indigo®, available from Hewlett Packard of Palo Alto, Calif. or Karat available from KBA of Williston, Vt. The present invention seeks to provide a prime card or intermediate that has a quality of at least about 150 or more lines per inch and preferably more than 300 lines per inch, which is approximately equal to about 2500 to 3500 dots per inch ("DPI") in order to create a high quality image that is intended to be aesthetically appealing to the consumer.

It has been discovered, that when the image is applied to the film, the ink dots that are generated by the printing device flatten partially on the surface of the film and that by then over coating the printing with an opaque, pigmented material, the integrity of the dots geometry is substantially retained. This surprisingly is different from prior art solutions, wherein a paper layer of material is applied over the dots or the ink dots are applied to the paper layer, which in either situation further compresses the ink as well as causes some of the ink to be absorbed into the paper layer thus decreasing the level of ink dot integrity and resolution. Any absorption of the ink into the paper backing layer will likely diminish the image quality. In addition, as such images may further dry or cure (with moisture being drawn from the ink into the paper), any bending of the card substrate may cause some level of microscopic cracking of the image on the card further contributing to the reduction in the quality of the card stock.

It is believed, that through the practice of the present invention, the amount of the external stresses on the ink dot configuration or the circular geometry of the ink pattern can be incrementally reduced thereby enabling the ink or particular ink dot pattern to coalesce better in order to retain the image design and quality of the printed image design and permit some level of image stretch due to potential dot growth. In addition, as no paper layer is utilized in the creation of the card product, issues associated with absorption are thus mitigated.

Reference is now directed to FIG. 1, which shows a cross sectional view of the prime card intermediate, generally designated by reference to numeral 10, produced in accordance with the present invention. The prime card intermediate 10 includes a card layer or substrate 12 which has first and second faces 14 and 16, respectively, and first and second longitudinally extending sides 13 and 15, respectively. The layer 12 also has first and second transversely extending edges which are not shown in this particular FIGURE.

In one exemplary embodiment, an adhesive layer 18, represented by "XXX" is provided on the first face 14 of the layer 12. It should be understood, that while in the present description surrounding FIG. 1 that the image will only be constructed on one side of the card base layer 12, both faces or sides of the card layer may be built up in the same way or manner as the one side described herein. The adhesive layer 18 is preferably a clear or substantially transparent material.

The layer of adhesive 18 as discussed may be applied between the pigmented layer 19 so as to hold the film, pigmented layer combination to the card substrate in those instances where the film, image and pigmented layer or layers are provided on the film. The layer of adhesive may be a permanent adhesive, removable adhesive or repositionable adhesive, or combination thereof, depending on the requirements of the end user. The adhesive is preferably applied so as to run the full width and length of the base card substrate 12, that is will cover the entire area of the substrate. Alternatively, the adhesive layer 18 may be applied in a pattern to accommodate a particular design or other configuration such as may be created in connection with a die cut construction to produce a design, shape or other arrangement.

A particulate containing layer 19 is provided over the adhesive coating and is shown with a varying density of particulate spread throughout the layer. A second pigmented layer 19*x* may also be provided on the first coated layer 19. Two or more layers, perhaps about as many as five layers of coating may be added over the card layer 12. The intent of adding the pigmented layers can be used to conceal or mask the color of the card layer such that the color of the card layer does not take away or detract from the image that will be subsequently applied.

The coating 19 that is applied over the card material is a pigmented material which preferably consists of a white particulate material suspended in a curable medium. An exemplary material includes Phase 36 available from Arcar Graphics of West Chicago, Ill. The pigmented layer 19 is shown by use of darker and lighter grouping of dots ranging from a lower density area to a higher density area (where the amount of pigment or particulate matter occurs at a greater level than the lower density level). By providing the pigmented layer 19 in a gradient that can shift in density from one portion of the image to another (a first area to a second area), the image 20 or 21 can appear to be "shaded" or "fogged" such that a portion of the image 20 or 21 in which a higher density of pigmentation appears behind will have a sharper or more distinct appearance whereas an area where a lower density is disposed, the image will appear more washed out than the area backed by the higher density pigmented portion. That is, the opacity of the backing coating changes over the gradient such that more light will pass through areas in which a lesser amount of pigmentation is present such that the image will appear weaker in the areas backed by the lesser pigmentation areas.

Next, an image 20 is provided in a face up format or alternatively in a reverse image format 21 if the image is printed on the film to be described. The image may be printed directly over the coating layers 19 or 19*x* if more than one coating layer is provided. As previously described, the coating layer 19 and 19*x* provide a protection for the ink dots that form the image and do not let the individual dots spread out or break or crack.

The substrate film 22 that is used in connection with the present invention is preferably selected from a transparent or substantially transparent material, such as a polyethylene, polyvinyl or other polyester based material. The glossy film stock 22 that is used in accordance with the present invention is a clear polyethylene film, such as PET, which has a thickness of less than 30 mils and preferably less than about 20 mils and still more preferably less than about 10 mils and between 2 mils and 8 mils. The film 22 may be treated with a print receptive coating such as a polyvinyl alcohol (PVA) or other material that may be used to anchor toner or ink to the surface of the film. The film may also include a translucent material or any combination of film based materials varying in opacity from one area to another of the substrate.

As described briefly, previously, an image 21 is printed in a reverse format (upside down of "printed image" as shown in the FIGURE). The image 21 may include graphics, text or a combination of each and preferably the image 21 is rendered using a non-impact printer which is capable of generating an image at a resolution of greater than about 150 or more lines per inch and preferably more than 300 lines per inch, which is approximately equal to about 2500 to 3500 dots per inch ("DPI") in order to create a high quality image that is intended to be aesthetically appealing to the end user.

Figure 2:
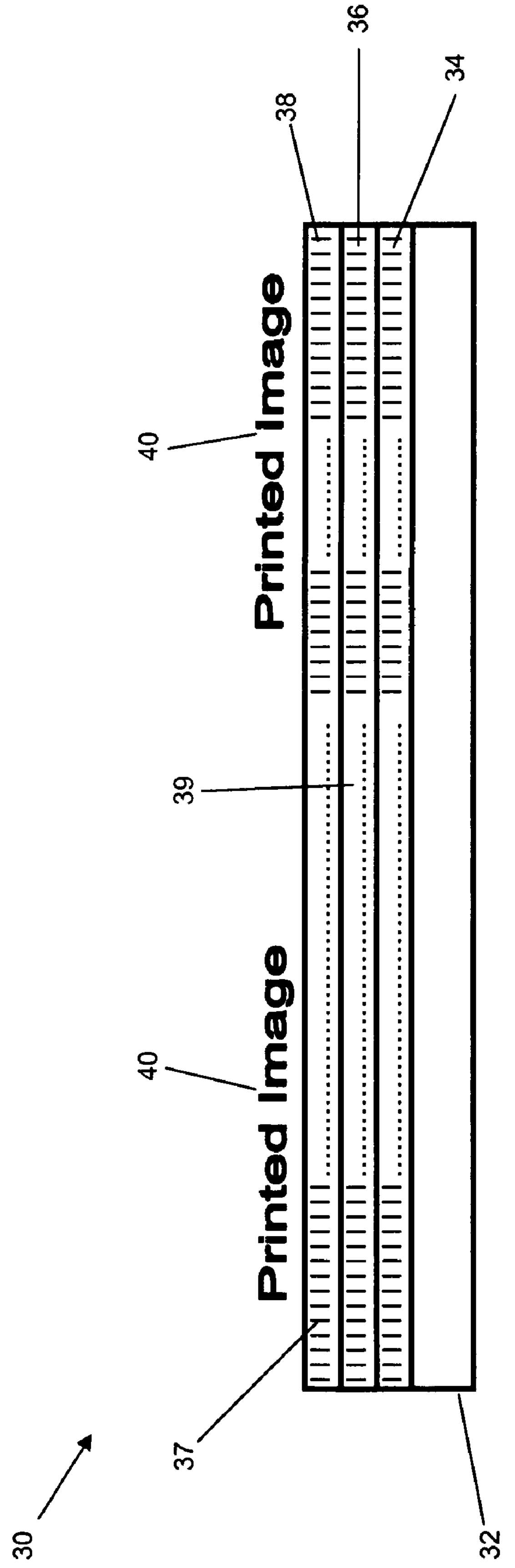
FIG. 2 provides a cross sectional view of an alternative exemplary embodiment of the card based business communication produced in accordance with the present invention.

Turning now to FIG. 2, an alternative embodiment of the card based business communication assembly is provided and designated generally by reference to numeral 30. Disposed on one face of the card layer 32 are a series of pigmented coatings 34, 36 and 38. In this embodiment, each of the layers 34, 36 and 38 are shown with varying density gradients from high density designated by reference numeral 37 to lower density areas 39. A printed image 40 is provided over the pigmented layers 34, 36 and 38. The image 40 may be at least partially encapsulated within the pigmented layers so as to partly protect the ink dots.

It is believed that when printing the ink dots on either the film substrate or pigmented coating layer or layers, the ink dots will flatten partially upon impact on the substrate (substantially transparent or transparent film), that is the dots will not be absorbed by the material onto which the ink is printed. The ink will remain on the surface of the substrate until cured, or until pressure is applied and the ink is otherwise absorbed. However, it is suspected that by providing an opaque coating that will surround the ink dots as opposed to a backing material that will create incremental pressure over the surface of the dots such as may occur with a sheet as is commonly accomplished in the prior art, the ink dots will remain in a partially flattened condition and be partially suspended within the opaque coating so that the surface geometry does not change and the individual ink dots are protected from further flattening.

Figure 3:
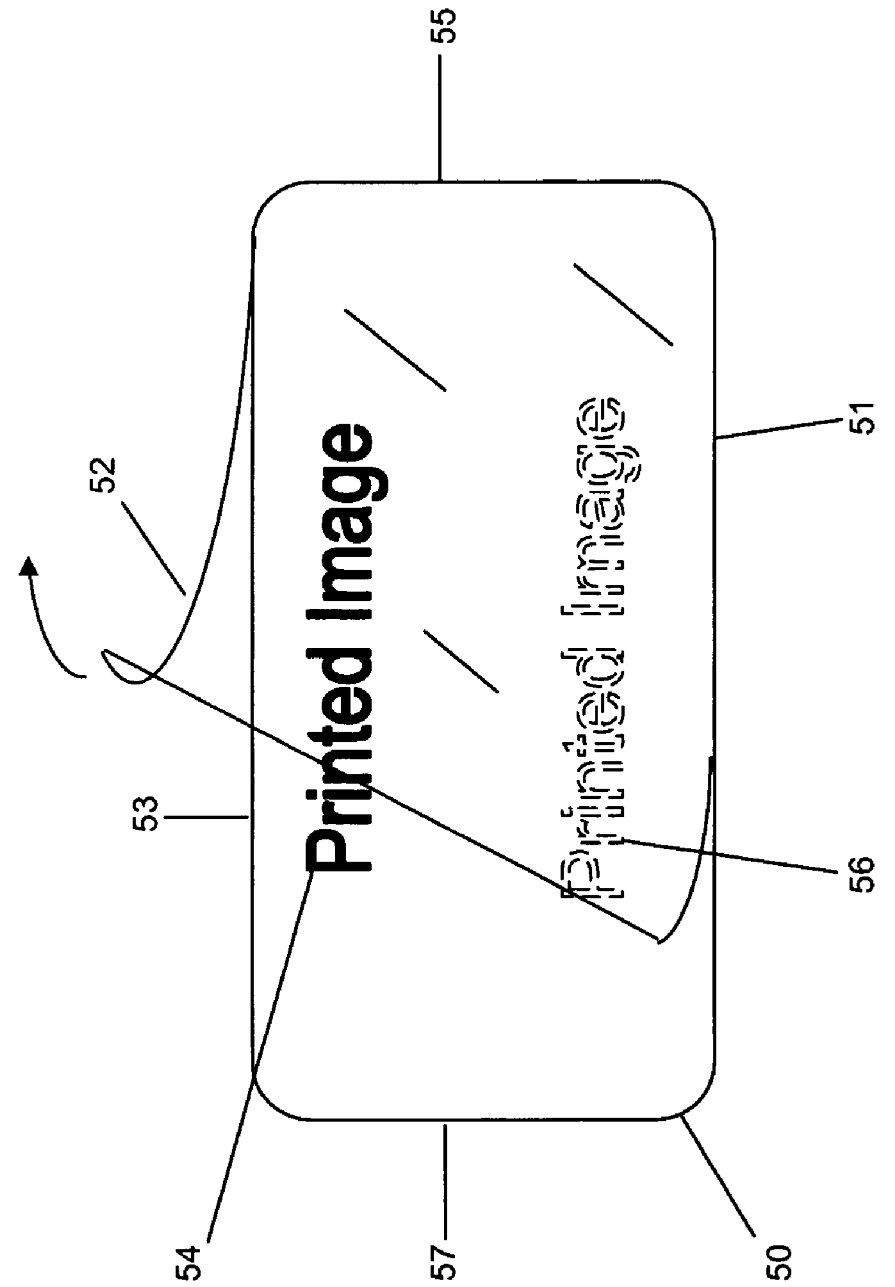
FIG. 3 illustrates a front view of a card based business communication produced in accordance the present invention.

Reference is now directed to FIG. 3 of the presently described embodiment of the present invention which shows a front view of a card based business communication designated generally by reference to the numeral 50. The assembly 50 includes first and second transversely extending edges 51 and 53 and first and second longitudinally extending sides 55 and 57, respectively.

The assembly 50 is shown with the film layer 52 being removed from the assembly. In this embodiment, if the printed image were initially provided on the film, printed in a reverse image as previously discussed, the image will then transfer to the coating which may also include an adhesive to help transfer the image to the surface of the pigmented layers.

The image 54 and 56 is shown in two distinct formats, one in which the image 54 is clearly visible and the second image 56 is partially visible or slightly fogged. This is due to applying the coatings shown in the previous FIGURES in a varying particulate density gradient and thus more of the color of the card layer will show through thus partially hiding the image that is provided over the pigmented coating layers.

Figure 4:
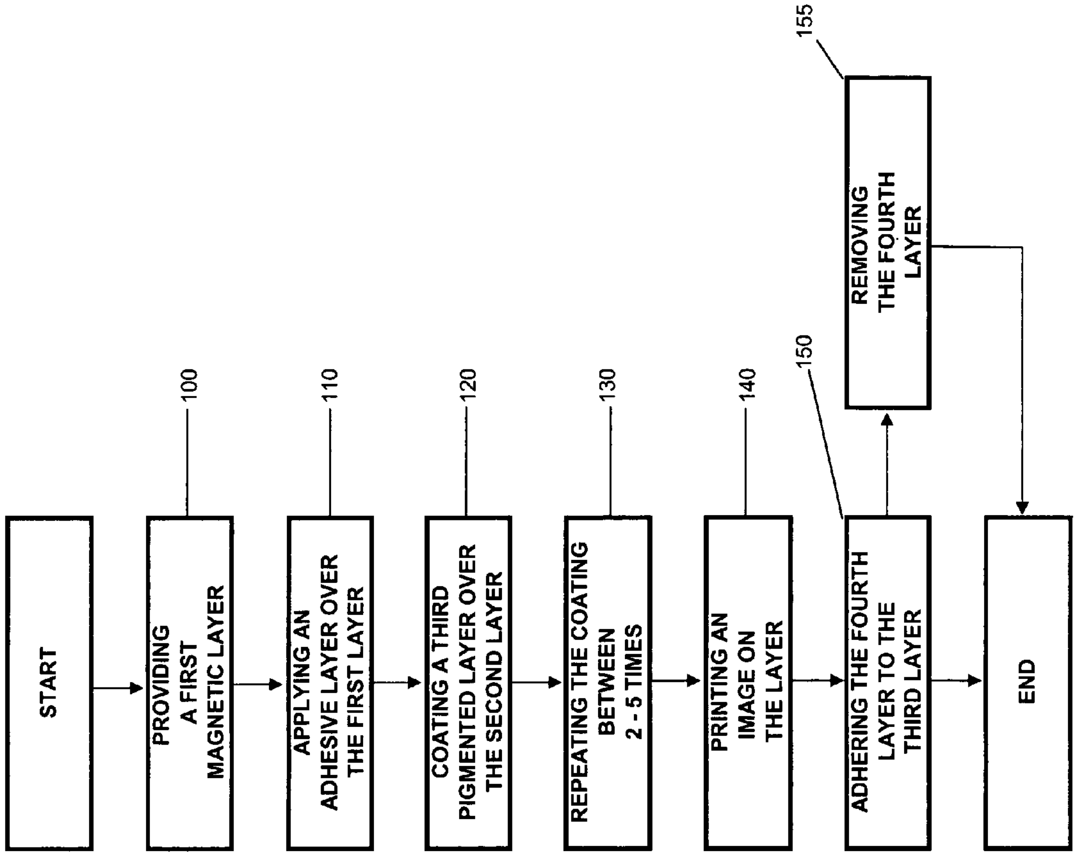
FIG. 4 presents a block diagram showing the steps in practicing an exemplary embodiment in producing the card based business communication described herein.

FIG. 4 represents a block diagram that is used in practicing a method utilized in manufacturing a card based business communication as described in the present invention. The method is started and at step 100 a card material, which is the first layer or base substrate of the construction is provided. Next, an adhesive layer is provided at step 110. The adhesive is preferably a permanent pressure sensitive adhesive that is clear or transparent.

Then at step 120 a third layer is provided over the adhesive layer. The third layer is a pigmented material that is used to mask or conceal some of the darkness of the card or base layer. Step 130, which may or may not be practiced in each production process provides for the coating of between two to five more layers of pigmented material over the adhesive to further conceal the darkness of the card or base layer.

At step 140, an image is printed over the third layer and as will be described in an alternate embodiment, the image may be applied to the film layer. Next, at step 150 a fourth film layer is adhered over the third layer. The fourth layer is preferably a clear film such as a polyester based material, e.g. PET. Each of the layers will preferably be applied so as to substantially completely cover the previous layers that have been applied to the base substrate or assembly.

In an additional step, shown at 155, the top film layer is peeled back or removed exposing the image. If the film layer remains it will add a protective layer as well as give the image a possibly glossy appearance. This then completes the manufacture of the card business communication assembly and the process is either restarted or the manufacturing process comes to an end.

Figure 5:
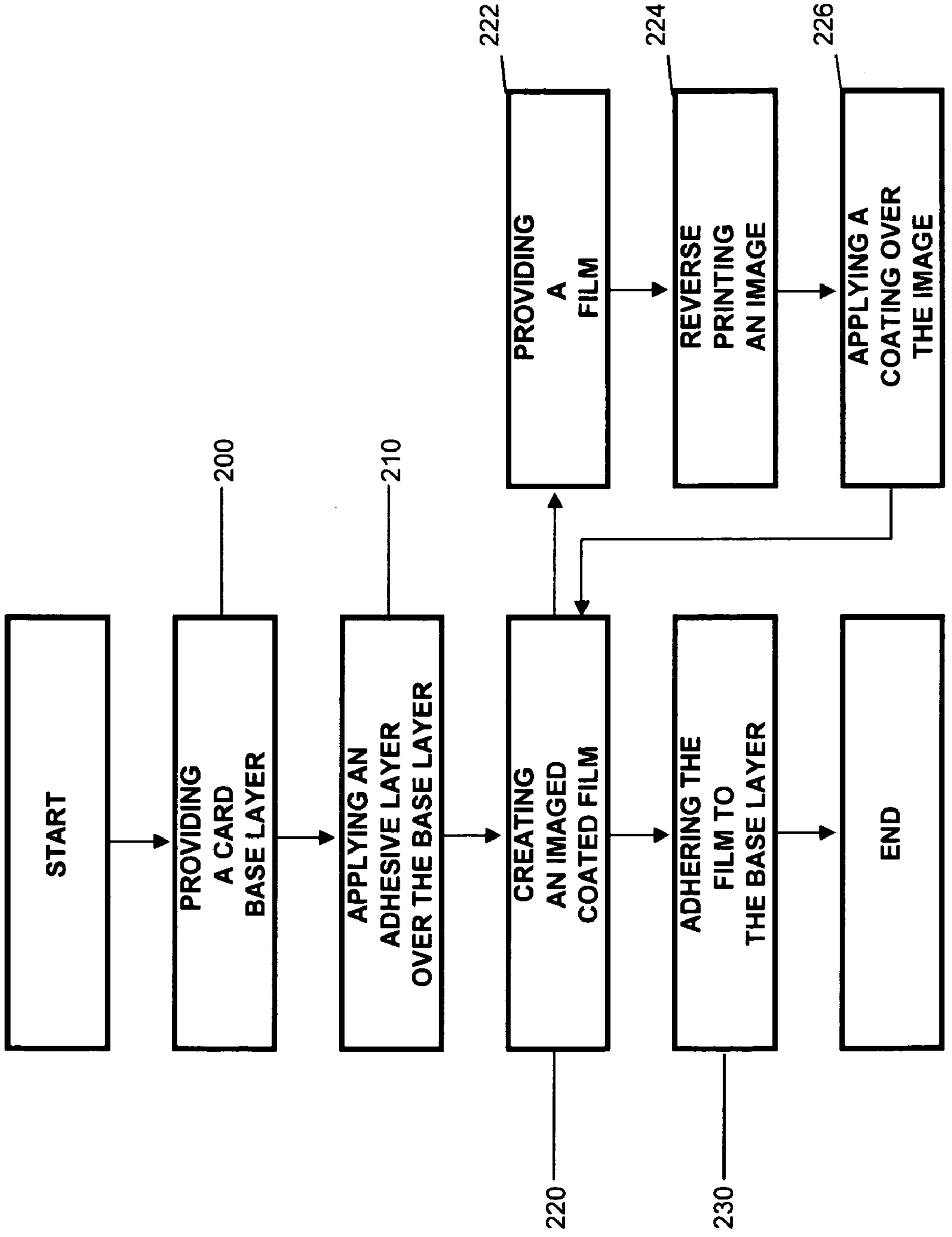
FIG. 5 shows an additional embodiment for manufacturing the card based business communication products described in the present invention.

FIG. 5 presents an alternate manufacturing method that is used in producing card based business communication products in connection with the present invention. The manufacturing process is again begun at step 200 with the provision of a card or base layer. An adhesive is applied over the base layer at step 210. The adhesive will preferably be a clear material and will substantially, completely cover the base layer that is running from edge to edge and side to side. It should be noted while the process is only describing the build up on one face of the substrate, it should be understood that the coatings can be applied to both sides of the card material.

Next, an image coated film is created at step 220. The film is preferably a printable polyester material, such as PET, which is provided at step 222 and the process includes printing on one face of the material, in a reverse format at step 224. Then a pigmented coating is applied over the printing at step 226.

The printed/coated film is then adhered to the base card material at step 230. By reverse format printing of the image, the image side is placed adjacent the adhesive layer so that the image will be visible through the first or top face of the film in right side up or normal orientation. Of course, the foregoing is more applicable to textual information and such graphics that may require a particular orientation. Other graphical depictions may not require the change in format printing.

The film layer may also be stripped away in connection with this embodiment, leaving the image laying directly on the pigmented layer, which also release from the film layer. To facilitate the removal of the film layer, a release coating can be provided on one or both faces of the film layer so that the affinity of the adhesive layer is greater than that of the film layer.

It will thus be seen according to the present invention a highly advantageous card based business communication assembly has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A method of making a card based business communication assembly with enhanced visual appeal, comprising the steps of:

a) providing a first layer forming a permanent card stock substrate, said substrate having a predetermined appearance;

b) applying a second layer over said substrate, said second layer including a substantially transparent adhesive component adapted to non-releasably adhere to said substrate, said second layer being substantially coextensive with said substrate;

c) coating a third non-ink receiving layer over said second layer, said third layer including pigments dispersed in a curable medium, said pigments being sufficient to at least partially conceal said predetermined appearance of said substrate;

d) providing a fourth, substantially transparent, layer forming a film having first and second faces;

e) printing on said second face of said film an image composed of discrete ink dots of predetermined shape, said image being printed in a reverse format such that said printed image is visible through said first face of said film; and f) adhering said second face of said film to said third layer, said third layer being such as not to substantially deform said dots.

2. The method of claim 1, in which the pigmentation in said third layer is non-uniformly dispersed.

3. The method of claim 2, in which said pigmentation is provided by pigment particles that are substantially white and substantially opaque.

4. A method of making a card based business communication assembly as recited in claim 1, including a further step of repeating the step of coating to produce a plurality of successive pigmented coating layers, and printing said image on one of said plurality of pigmented layers prior to the application of the next pigmented layer.

5. A method of making a card based business communication assembly as recited in claim 1, including removing said film such that said image transfers to at least one of said pigmented layers after the step of adhering said fourth layer over said third layer.

* * * * *